Sept. 10, 1940.     A. R. HENDRY     2,214,461
PATCH CUTTING MACHINE
Filed Aug. 10, 1939     2 Sheets-Sheet 1
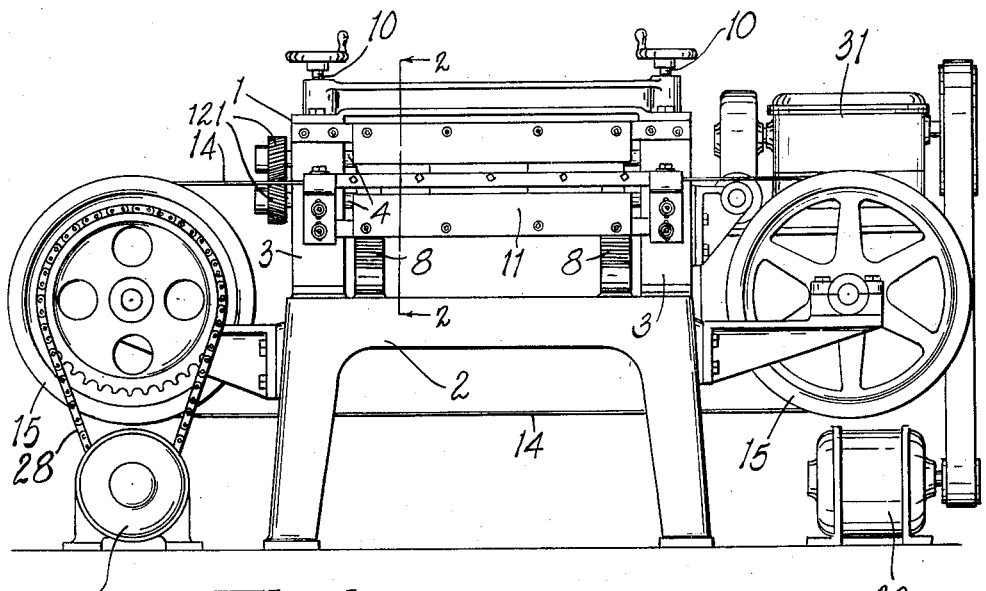
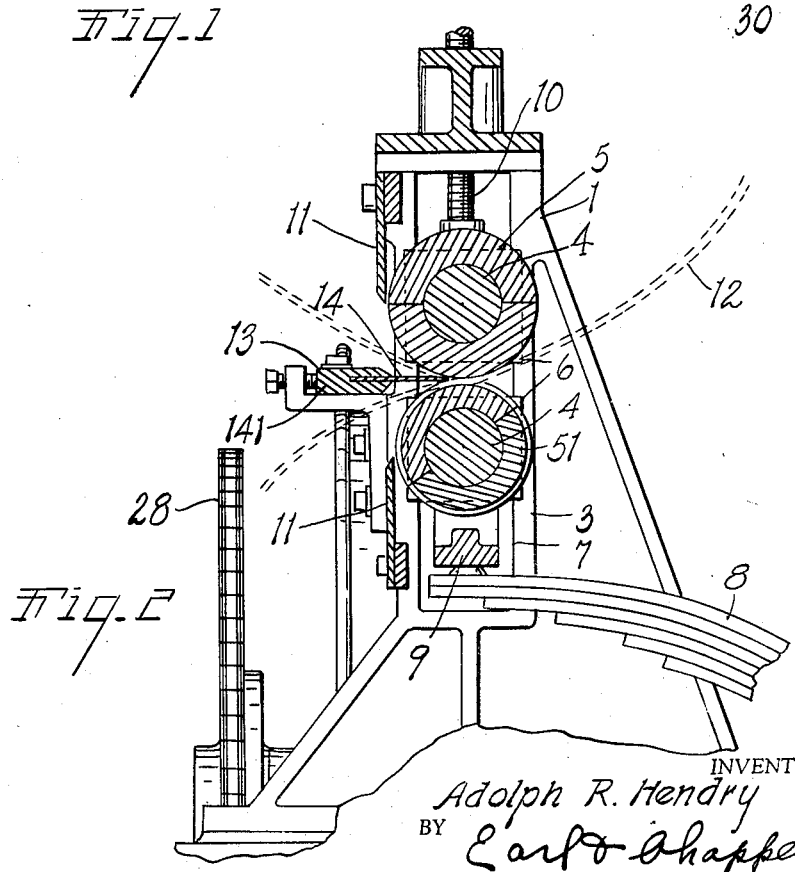
INVENTOR.
Adolph R. Hendry
BY Earl & Chappell
ATTORNEYS Sept. 10, 1940.  A. R. HENDRY  2,214,461
PATCH CUTTING MACHINE
Filed Aug. 10, 1939  2 Sheets-Sheet 2
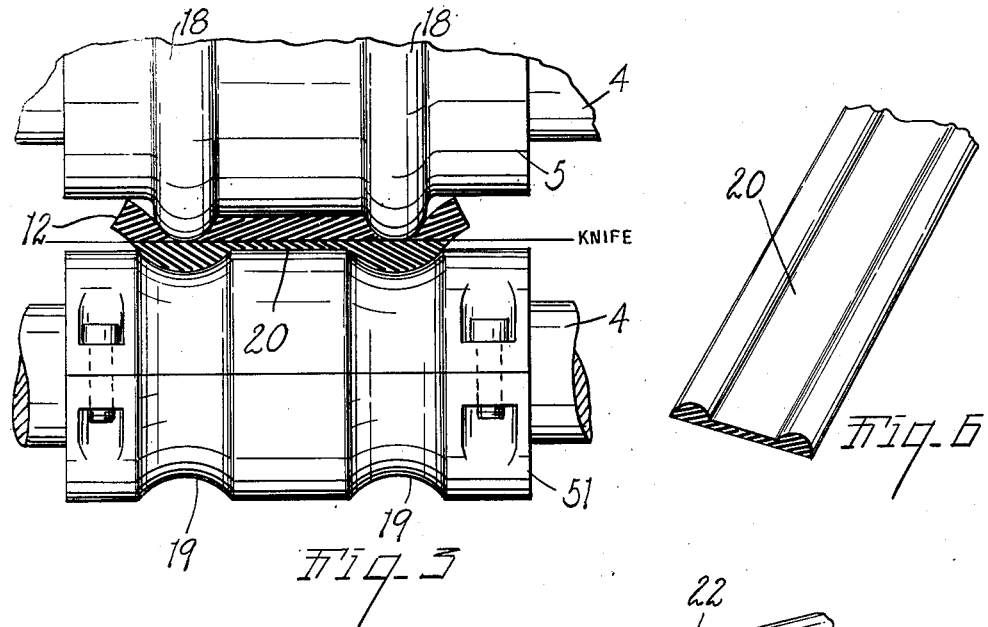
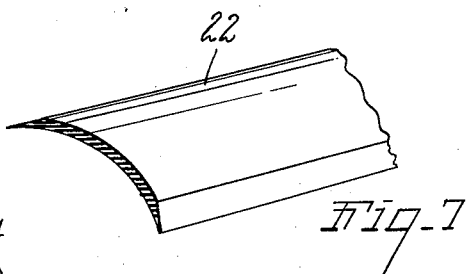
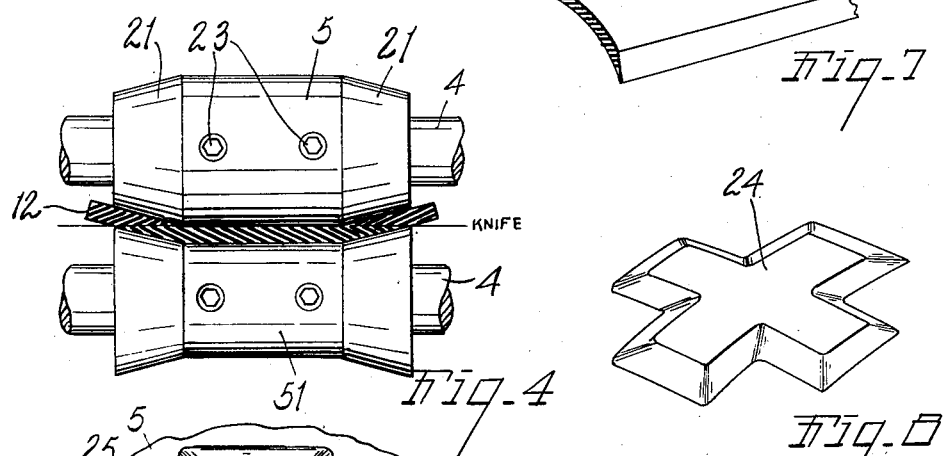
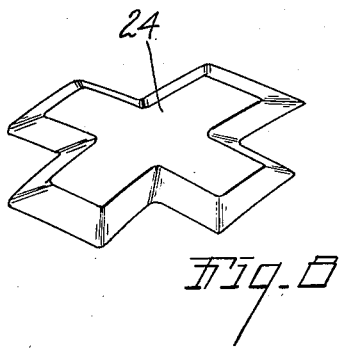
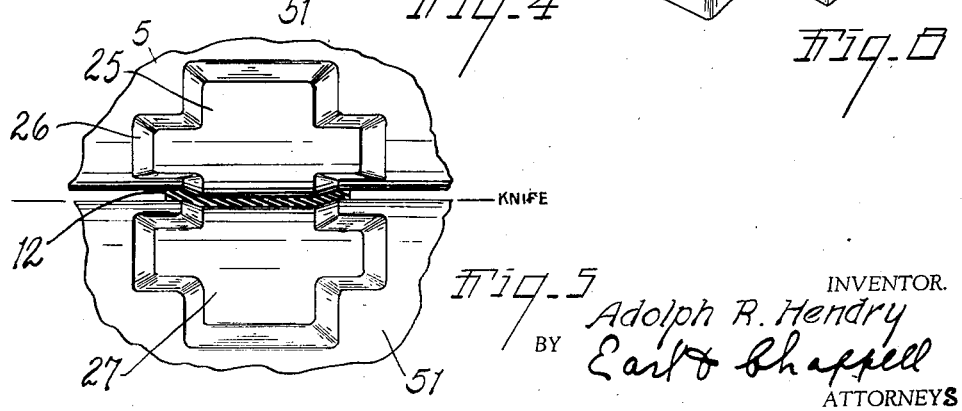
INVENTOR.
Adolph R. Hendry
BY Earl F. Chappell
ATTORNEYS Patented Sept. 10, 1940

2,214,461

UNITED STATES PATENT OFFICE 2,214,461

PATCH CUTTING MACHINE

Adolph R. Hendry, Portland, Mich.

Application August 10, 1939, Serial No. 289,426

8 Claims. (Cl. 164—35)

This invention relates to improvements in patch cutting machines.

The main objects of my invention are:

First, to provide an improved machine for cutting tire repair patches from used tire casing or similar stock.

Second, to provide a machine of the type described having means for forming the aforesaid patches in any desired outline and to produce a uniformly feathered edge thereon.

Third, to provide a machine of the type described including a pair of rolls between which the tire casing material or other suitable material is fed and novel means for applying desired pressure on the rolls to assure successful operation.

Fourth, to provide a machine of the type described having a cutting knife or blade of the endless guided band type in association with a pair of rolls having coacting die elements thereon for advancing the stock against the blade and producing the desired configuration of the patch.

Fifth, to provide a patch cutting machine having a pair of coacting formed die elements for forwarding stock and an endless knife or blade positioned adjacent the pressure point or line of the elements for excising patches and the like from the stock, the said endless knife or blade being either a longitudinally traveling band element or a rotary element positioned so that its periphery intersects the said pressure point or line.

Further objects relating to details and economies of my invention will definitely appear from the description to follow. The invention is defined in the claims.

A structure embodying the features of my invention is illustrated in the accompanying drawings, wherein:

Fig. 1 is a view in front elevation illustrating the machine in accordance with my invention.

Fig. 2 is an enlarged fragmentary view in section on a line corresponding to line 2—2 of Fig. 1, illustrating details of construction of the roller mounting means of my invention.

Figs. 3, 4, and 5 are fragmentary detail views of modified embodiments of the roller patch forming elements as contemplated by my invention, the mating rollers of each pair being shown in operative relation to the tire casing material or other stock on which they operate, which latter is shown in section.

Figs. 6, 7, and 8 are perspective views illustrating the resultant article produced respectively by machines employing the mating roller couples illustrated in Figs. 3, 4, and 5.

In general, this invention relates to a tire patch cutting device such as is shown in the patent to Hendry et al. 1,731,132, of October 28, 1929, i. e., of the type in which a supply of tire casing material is fed between a pair of rollers and operated upon by a continuously moving endless blade or slicing element. This element is guided for movement parallel to the bite of the elements and closely adjacent the latter so as to slice the advancing material and produce the individual tire patches in the manner described in the aforesaid patent. In particular, the present invention relates to roller elements of novel form constituting the forming members for the machine and to novel means for applying compression on the rollers whereby the latter squeeze the rubber fabric operated on and make possible the production of patches in any desired form or outline all characterized by a desired uniformly feathered edge or by a very uniform conformation of whatever type desired.

In the drawings, the reference numeral 1 in general indicates the machine of my invention which has a suitable standard or base 2 supporting a pair of pedestals or end frames 3 in which the shafts 4 carrying the forming rollers 5, 51 constituting a feature of my invention are journaled. The journaling means for said rollers includes suitable end blocks 6 mounted for vertical slidable approaching and separating movement in guides 7 in the end frames 3. As illustrated in Figs. 1 and 2, the lowermost forming roller is urged upwardly by a multi-leaf laminated spring 8 secured to the standard and engaging a transverse yoke 9 for the lower sliding block 6, while the uppermost roller is screw adjusted at either end by the manually operated screws 10. Each of the rollers is provided with a fixed doctor 11 for preventing adherence thereto of any part of the excised tire fabric strip which is illustrated in dotted lines and indicated by the reference numeral 12. The rollers 5, 51 are driven in unison by meshing gears 121 on shafts 4.

The slicing operation, to be hereinafter described in detail, whereby the strip of tire fabric or other strip stock 12 is converted into the desired tire patches such as are illustrated in Figs. 6, 7, and 8 is generally designated by the reference numeral 13 and includes an endless metal blade or knife 14 trained around spaced pulleys 15 so that the upper pass or reach thereof is immediately adjacent and parallel to the bite of the rollers 5, 51. Along this line, the blade is supported and guided by the guide 141 extending transversely of the machine and serving to prevent lateral movement of the blade and insure an even, uniform cut. The blade and guide may be adjusted toward and from the rollers by the set screw means 151 and the blade guide 141 may be raised and lowered relative to the rollers by manipulation of its adjustable mounting illustrated in Fig. 1 and indicated by the reference numeral 16.

Referring now to Figs. 3, 4, and 5, wherein I illustrate various modified types of forming rollers in accordance with my invention for producing the desired shape and outline of the patch which is the product of this machine, the male and female rollers are identified by the numerals 5, 51 respectively, each being preferably made up of a pair of semi-circular elements secured on the respective shafts by bolts or screws 17. The male roller 5 has a pair of annular, axially spaced radial rounded projections 18 coacting with similar depressions 19 in the female roller 51. The rollers 5, 51 are mounted in a manner to space projections 18 vertically from the grooves but sufficiently close thereto to compress and force the material of strip 12 into the grooves. The blade or knife is positioned as illustrated to cut through the fabric on a line level with the greatest radius of projections 18 and in vertically spaced relation to the periphery of roller 51. Due to the spring tension exerted by the leaf spring 8, modified as desired by adjustment of the adjusting screws 10, the material of the supply strip 12 fed between the mating rollers 5, 51 is forced by projections 18 into the grooves 19 so that the blade cuts off a patch strip or formed web 20 in the outline illustrated in Fig. 6 which may later be subdivided into desired lengths. Any desired change in the configuration of this strip may be obtained by altering the outline of rollers 5, 51.

In Fig. 4 I illustrate the mating forming rollers 5, 51 in a modified embodiment wherein the male element is substantially barrel shaped having inwardly tapered ends 21 and the female roller is in a generally hourglass shape, the parts coacting to conform the strip 12 whereby blade or knife 14 cuts off the edges of the rubber fabric stock along a line flush with the lowermost edge of the male roller to produce a uniformly feather edged patch 22 as illustrated in Fig. 7, which may likewise be cut into lengths as desired.

In Fig. 4 it will be noted that I illustrate a modified means of securing the rollers 5, 51 on their shafts 4, in the form of the radially disposed set screws 23 engaging the shafts.

In Fig. 5, I illustrate a still further modified embodiment of my invention for producing the individual cross-shaped, feather edged patches indicated by the reference numeral 24 in Fig. 8. It will be observed that the male roller 5 has the projection 25 in the outline of the desired patch and provided with inclined edges 26 while the female roller 51 has a similarly formed mating depression 27 therein. The cut made by the knife is flush with the upper surface of the female roller 51 so as to excise the resultant patch 24 from within the side confines of the strip 12.

The continuous knife or blade 14 trained around pulleys 15 is actuated by a chain drive 28 from a suitable motor 29 while shafts 4 are actuated from a further motor 30 through a belt drive and gearing of conventional type which is generally designated 31, preferably including as a part thereof a Reeves drive mechanism whereby the speed of the rollers may be varied.

Although the endless longitudinally traveling band type of cutting element or blade is preferred in accordance with my invention, the latter is not restricted in its scope to this type of cutter and in substitution therefor I may use a rotary cup-shaped blade, i. e., one having a peripheral continuous blade extending laterally from a rotatably mounted support with the blade positioned closely adjacent the bite or pressure point of the coacting die elements. In case such a cutter is utilized, it may be necessary to alter the general configuration of the die elements to accommodate the curvature of the cutting blade, for example, in a manner generally similar to the conformation of the coacting elements illustrated in Fig. 4. Such modification is intended to fall within the scope of my invention as outlined in the appended claims.

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. In a tire patch cutting machine of the type including an endless cutting blade and means for guiding and restraining said blade for movement transverse the machine, a pair of spaced rollers on parallel shafts journaled in said machine, said rollers being parallel to the path of travel of the blade and positioned with the bite thereof immediately adjacent one of the reaches of the blade, one of said rollers having spaced, annular, radially projecting forming elements intermediate and spaced from the ends thereof and the other of the rollers having continuous annular depressions alined axially with said forming elements, said forming elements forcing rubber fabric material against said other roller whereby to compress the same and fill said depressions, said rollers feeding said material against said blade to slice from the material a strip having a uniformly feathered edge and laterally spaced portions of different thickness, said blade being positioned at the radial extremity of said projections, and means for exerting pressure on said rollers comprising means for mounting the rollers on the machine for approaching and separating movement, a leaf spring member on the machine engaging the mounting means for one of the rollers and urging the same in the direction of the other, and adjustable screw means for sustaining the mounting means of said other roller.

2. In a patch cutting machine of the type including an endless cutting blade, a pair of spaced rollers on parallel shafts journaled in said machine, said rollers being parallel to the path of travel of the blade and positioned with the bite thereof immediately adjacent the blade, one of said rollers having an annular, radially projecting forming element intermediate and spaced from the ends thereof and the other of the rollers having a continuous annular depression alined axially with said forming element, said forming element forcing rubber fabric material against said other roller whereby to compress the same and fill said depression, said rollers feeding said material against said blade to slice from the material a strip having a uniformly feathered edge and portions of different thickness, and means for exerting pressure on said rollers comprising means for mounting the rollers on the machine, and a spring member on the machine engaging the mounting means for one of the rollers and urging the same in the direction of the other.

3. In a cutting machine of the type including an endless cutting blade and means for guiding and restraining said blade for movement transverse the machine, a pair of spaced rollers on parallel shafts journaled in said machine, said rollers being parallel to the path of travel of the blade and positioned with the bite thereof immediately adjacent one of the reaches of the blade, one of said rollers having a spaced, annular, radially projecting forming element intermediate and spaced from the ends thereof and the other of the rollers having a continuous annular depression alined axially with said forming element, said forming element forcing rubber fabric material against said other roller whereby to compress the same and fill said depression, said rollers feeding said material against said blade to slice from the material a strip having a uniformly feathered edge and portions of different thickness, said blade being positioned at the radial extremity of said projection, and means for exerting pressure on said rollers.

4. In a patch cutting machine of the type including an endless cutting blade and means for guiding and restraining said blade for movement transverse the machine, a pair of spaced rollers on parallel shafts journaled in said machine, said rollers being parallel to the path of travel of the blade and positioned with the bite thereof immediately adjacent one of the reaches of the blade, one of said rollers having a radially projecting cruciform male die element intermediate and spaced from the ends thereof and the other of the rollers having a similarly formed female die element alined axially with said male element, said male element being spaced from said female element and forcing rubber fabric material against said other roller whereby to fill said female die element and enable said blade to slice said fabric in a strip having a uniformly feathered edge and portions of different thickness, and a leaf spring member on the machine acting on one of the rollers and urging the same in the direction of the other.

5. In a cutting machine of the type including an endless cutting blade and means for guiding and restraining said blade for movement transverse the machine, a pair of spaced rollers on parallel shafts journaled in said machine, said rollers being parallel to the path of travel of the blade and positioned with the bite thereof immediately adjacent one of the reaches of the blade, one of said rollers having a radially projecting formed male die element and the other of the rollers having a similarly formed female die element alined axially with said male element, said male element being spaced from said female element and forcing rubber fabric material against said other roller whereby to fill said female die element and enable said blade to slice said fabric in a strip having a uniformly feathered edge and portions of different thickness, and spring means on the machine acting on one of the rollers and urging the same in the direction of the other.

6. In a cutting machine, a pair of rollers having parallel shafts, means for rotatably mounting said shafts, and means for positively driving said shafts together, coacting laterally spaced projections and depressions of similar form on said respective rollers, said rollers being spaced from contact with one another and adapted to compress a strip of rubber fabric fed therebetween whereby the fabric is forced by said projections into said depressions, leaf spring means acting directly on one of said rollers to urge the same against the other, and means for adjusting the position of said other roller, and an endless cutting element disposed adjacent and parallel to the bite of said rollers for cutting engagement with said strip at a point spaced substantially from the outermost surface of the roller carrying the depressions in a direction parallel to the plane of the axes of the rollers whereby to produce a patch having relatively thick portions connected by a relatively thin portion.

7. In a cutting machine, a pair of rollers having parallel shafts, means for rotatably mounting said shafts, and means for positively driving said shafts together, coacting laterally spaced projections and depressions of similar form on said respective rollers, said rollers being adapted to compress a strip of rubber fabric fed therebetween whereby the fabric is forced by said projections into said depressions, spring means acting directly on one of said rollers to urge the same against the other, and an endless cutting element disposed adjacent and parallel to the bite of said rollers for cutting engagement with said strip at a point spaced substantially from the outermost surface of the roller carrying the depressions in a direction parallel to the plane of the axes of the rollers whereby to produce a patch having relatively thick portions connected by a relatively thin portion.

8. In a cutting machine, a pair of rollers having parallel shafts, means for rotatably mounting said shafts, and means for positively driving said shafts together, a coacting projection and depression of similar form on said respective rollers, said rollers being spaced from contact with one another and adapted to compress a strip of rubber fabric fed therebetween whereby the fabric is forced into said depression, leaf spring means on the machine acting directly on one of said rollers to urge the same against the other, and a continuous cutting element disposed adjacent and parallel to the bite of said rollers for cutting engagement with said strip at a point spaced substantially from at least one of the rollers in a direction parallel to the plane of the axes of the rollers.

ADOLPH R. HENDRY.